March 11, 1930. H. A. DENMIRE 1,750,613
APPARATUS AND METHOD OF VULCANIZATION
Filed May 26, 1927

INVENTOR
Harold A. Denmire
BY Evans & McCoy
ATTORNEYS

Patented Mar. 11, 1930

1,750,613

UNITED STATES PATENT OFFICE

HAROLD A. DENMIRE, OF AKRON, OHIO, ASSIGNOR TO THE GENERAL TIRE & RUBBER COMPANY, OF AKRON, OHIO, A CORPORATION OF OHIO

APPARATUS AND METHOD OF VULCANIZATION

Application filed May 26, 1927. Serial No. 194,280.

This invention relates to the vulcanization of tire casings and particularly to an improved process and apparatus for expanding the tire casing during the vulcanizing operation.

Heretofore it has been customary to use inflatable air bags or other expansible media for expanding the tire casing into intimate relation with the mold surface during its vulcanization. Effort has also been made heretofore to expand the tire casing into intimate relation with the mold by the use of inert gases and plastic compounds. The expense of using inert gases has heretofore been believed to be prohibitive and the plastic compounds used have in general embodied constituents that have harmful effect upon the structure of the tire casing. This is particularly true of plastic compositions embodying water that enters into the fibre structure of the casing.

The present invention contemplates the use of dry sand or other material as an expanding medium for forcing the tire casing into intimate relation with the side walls of the mold structure.

One of the objects of the present invention is to provide an inexpensive vulcanizing process that will avoid the use of air bags, cores and the like, and that will expand the tire casing into intimate relation with the walls of the mold through the agency of an expanding medium that is substantially inert with respect to the material of the tire casing.

An additional object of the invention is to provide apparatus for carrying out the above described process.

An illustrative embodiment of the invention is shown in the accompanying drawing, wherein.

Figure 1:
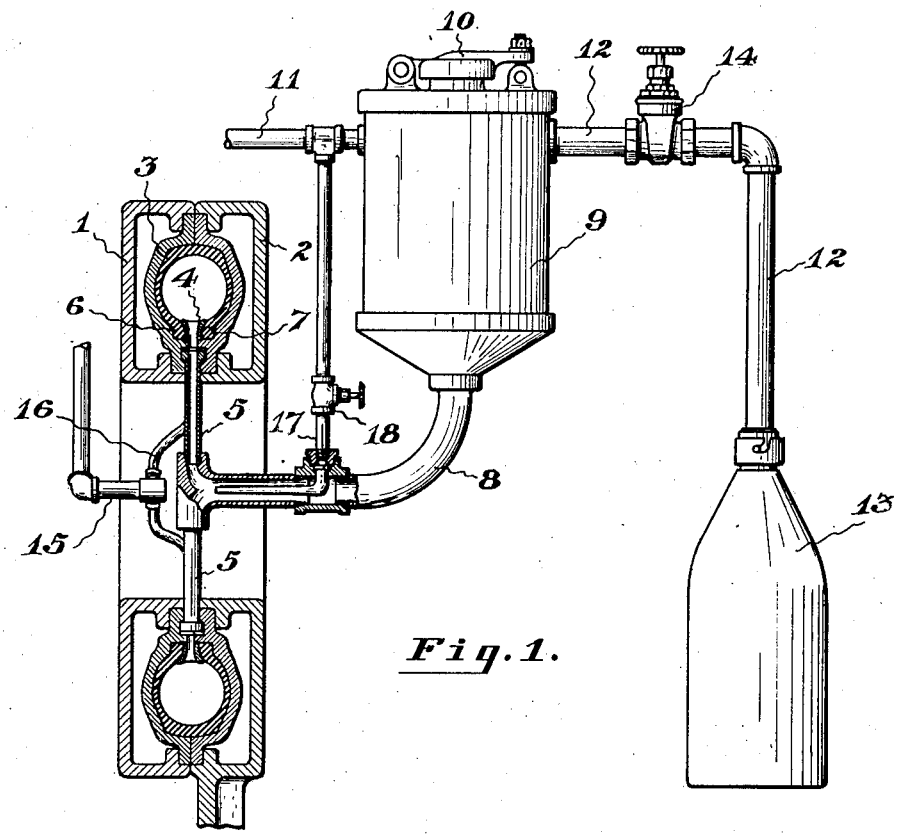
Figure 1 is a side elevational view shown partially in section with parts broken away of apparatus for use in vulcanizing tire casings in accordance with the hereindescribed process.

The structure shown in the accompanying drawings embodies a pair of mated mold members 1 and 2 that together define a molding cavity for receiving a pneumatic tire casing 3. A suitable bull ring 4 that has apertures therethrough that communicate with supply pipes 5 is interposed between the bead portions 6 and 7 of the tire casing, with which it forms a substantially fluid-tight connection. Each of the ducts 5 communicate with a supply pipe 8 that extends to a suitable container 9 wherein the finely divided material or other desired substantially dry material for use in the vulcanizing process is supplied to the tire casing.

The container 9 has a removable cover 10, a supply pipe 11 for admitting air under pressure thereto, a discharge line 12 that leads to a collecting bag 13 and that has a suitable valve 14 interposed in the line.

The bull ring 4 also has a series of apertures that communicate with suitable air pressure ducts 16 intermediate successive sand supply ducts 5. Each of the ducts 5 is connected to a suitable pressure supply duct 15 that provides air pressure for forcing the sand or other material used in the vulcanization of the casing back through the supply tubes 5 into the container 9 therefor.

An air line 17, that extends from the main line 11 to a position within the supply tube 8, serves to start the flow of material into the tire casing from the container 9 in the event that the material packs or does not readily flow when pressure is applied to the line 11. A suitable valve 18 serves to control the flow of air through the line 17. This valve is closed after the flow of material into the casing begins.

Figure 2:
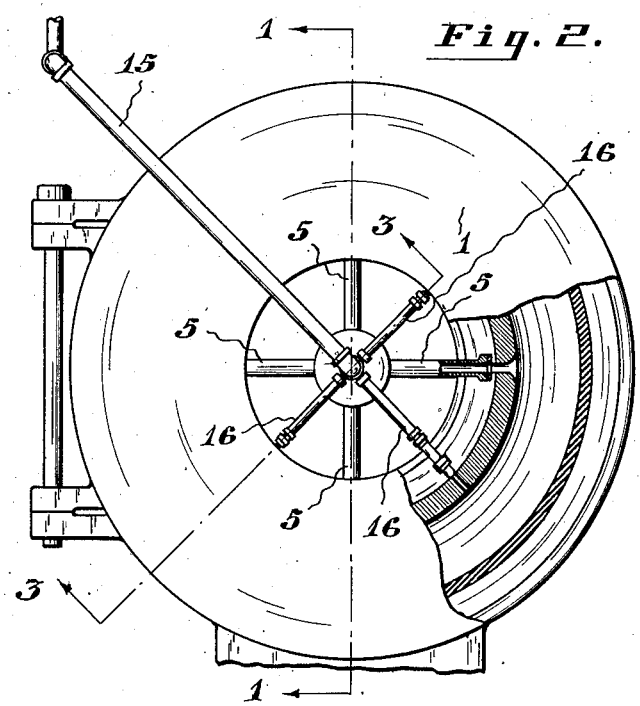
Fig. 2 is a diagrammatic view of the inflating connections leading to the tire casings.
Figure 3:
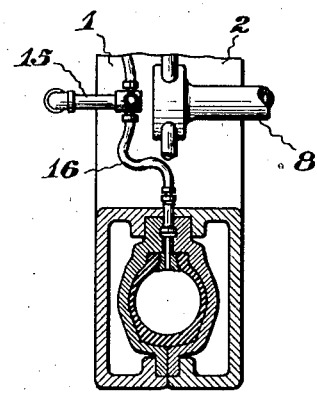
Fig. 3 is a transverse cross sectional view, with parts broken away, taken substantially on line 3—3 of Fig. 2.

In the vulcanization of tire casings in accordance with the process herein disclosed, the container 9 is first charged with fine sand or other desired finely divided or powdered material, a fine clean sand having round grains being preferred. The cover 10 is then secured in place and pressure is applied to the sand within the container 9 through the air inlet pipe 11. This forces the sand through the supply pipe 8 and branch ducts 5 to the interior of the casing. The supply ducts 5 distribute the sand uniformly throughout the tire casing. The air pressure back of the sand forces the sand into the tire cavity at a very rapid rate. After the tire casing is inflated to the desired degree, the supply of air through the pressure pipe 11 is cut off and the jacketed mold units 1 and 2 remain heated for the period of time necessary to properly vulcanize the tire casing. After vulcanization of the casing is completed, the valve 14 that communicates with the porous collecting bag 13 of the nature generally used on vacuum cleaners and like equipment, is opened. Air under pressure is then admitted through the pressure pipe 15 to the distributing pressure tubes 16 that alternate with the communicating tubes 5 in the manner shown in Fig. 2. The air pressure thus admitted to the interior of the tire casing through communication tubes 16 forces the inflating material back through the communication ducts 5, the supply duct 8, the container 9 and the collection pipe 12, into the porous collecting bag of the system 13. This bag 13 acts as a means for collecting the material thus returned from the interior of the tire casing. After the collection of the material in the bag 13, the bag is removed from its support and the material is turned back into the container 9 through the cover 10. In this way the material may be used over and over again and considerable heat is retained therein during successive vulcanizing operations.

In a system of the character proposed considerable benefit is obtained from the vulcanization of the tire casing on an inert finely divided material that does not affect the character of the tire casing. The material that is used for inflation purposes is preferably of such character that it may readily be completely freed from the tire casing. This is particularly true of sand having fine round grains of the character proposed.

It will be apparent to those skilled in the art that a medium of expansion such as that herein proposed will be particularly suitable for the inflation of tire casings where it is desired to dispense with the use of inflating air bags. The proposed material is inert relative to the tire casing and therefore it will not attack the casing or otherwise injuriously affect the interior thereof.

It will also be apparent that such of the inflating air as finds its way in the tire casing during the inflating process will be insufficient to detrimentally affect a tire casing.

I claim:

1. The process of vulcanizing tire casings that consists in expanding the tire casing on a body of substantially loose finely divided material forced into the casing under pressure, and vulcanizing the expanded tire casing.

2. The method of vulcanizing tire casings that consists in forcing into the casing under pressure an expanding body of substantially dry finely divided material, and subjecting said casing to heat and pressure while expanded by said material to cause its vulcanization.

3. The method of vulcanizing tire casings that consists in forcing substantially dry sand into a tire casing under pressure during the vulcanization thereof to expand the casing into intimate contact with the mold cavity.

4. The method of expanding a tire casing during the process of vulcanization that consists in forcing dry heated sand under pressure into the interior of a casing confined in a molding cavity to thereby expand the casing into intimate contact with the mold cavity and to compress the side wall thereof.

5. Means for expanding tire casings during vulcanization that consists in an air-tight container adapted to receive finely divided solid material, a mold for receiving a tire casing, a sealing ring interposed between the bead portions of the casing and having a plurality of distributed apertures therethrough, and means connecting the container with each of the apertures.

6. Means for expanding tire casings during vulcanization that consists in an air-tight container adapted to receive finely divided solid material, a mold for receiving a tire casing, a sealing ring interposed between the bead portions of the casing and having a plurality of distributed apertures therethrough, means connecting the container with each of the apertures, pressure supply apertures formed in said ring intermediate said first apertures, and means for supplying fluid pressure to the interior of said casing through said intermediate apertures for removing the finely divided solid material.

7. Means for expanding tire casings during vulcanization that consists in an air-tight container adapted to receive finely divided solid material, a mold for receiving a tire casing, a sealing ring interposed between the bead portions of the casing and having a plurality of distributed apertures therethrough, means connecting the container with each of the apertures, pressure supply apertures formed in said sealing ring intermediate said communicating apertures, means for supplying fluid pressure to the interior of said casing through said intermediate apertures for removing the finely divided material from the tire casing, and collecting means in communication with said container for collecting the finely divided material.

In testimony whereof I affix my signature.

HAROLD A. DENMIRE.